United States Patent [19]
Sundstedt et al.

[11] Patent Number: 5,384,946
[45] Date of Patent: Jan. 31, 1995

[54] EXPANDABLE, STOWABLE VEHICLE SEAT FOR CHILDREN

[75] Inventors: Per Sundstedt, Gothenburg; Bengt Ode, Harestad, both of Sweden

[73] Assignee: AB Volvo, Sweden

[21] Appl. No.: 969,255

[22] PCT Filed: Aug. 23, 1991

[86] PCT No.: PCT/SE91/00562
§ 371 Date: May 10, 1993
§ 102(e) Date: May 10, 1993

[87] PCT Pub. No.: WO92/03306
PCT Pub. Date: Apr. 5, 1992

[30] Foreign Application Priority Data
Aug. 23, 1990 [SE] Sweden ............ 90027728-5

[51] Int. Cl.⁶ ............................................. A47C 15/00
[52] U.S. Cl. ........................................ 297/238; 297/14; 297/117; 297/250.1; 297/283
[58] Field of Search .............. 297/238, 14, 107, 109, 297/110, 113, 114–117, 250.1, 251, 283, 284.3, 411, 2, 411.3, 411.31, 411.32, 411.35, 411.37, 411.38, 452.2

[56] References Cited

U.S. PATENT DOCUMENTS

| | | | |
|---|---|---|---|
| 5,098,157 | 3/1992 | Surot | 297/250.1 |
| 5,121,965 | 6/1992 | Skold et al. | 297/283 X |
| 5,193,765 | 3/1993 | Simpson et al. | 297/238 X |
| 5,205,608 | 4/1993 | Stig | 297/238 |

FOREIGN PATENT DOCUMENTS

| | | | |
|---|---|---|---|
| 258194 | 3/1988 | European Pat. Off. | 297/238 |
| 2043602 | 3/1972 | Germany | 297/238 |
| 2023415 | 1/1980 | United Kingdom | 297/238 |
| 2167949 | 6/1986 | United Kingdom | 297/238 |

*Primary Examiner*—Laurie K. Cranmer
*Attorney, Agent, or Firm*—Lerner, David, Littenberg, Krumholz & Mentlik

[57] ABSTRACT

The present invention relates to a vehicle seat comprising a seat section and a back section, preferably pivotably arranged in relation to each other, whereby the seat is inwardly and outwardly foldable and in its outwardly folded position the two sections can be arranged in substantially perpendicular positions for use as a seat, or with the two sections in substantially parallel positions for use as an armrest, whereby said seat section is provided with widening means so that the width of the seat section can be adjusted.

20 Claims, 6 Drawing Sheets

EXPANDABLE, STOWABLE VEHICLE SEAT FOR CHILDREN

TECHNICAL FIELD

The present invention relates to a stowable vehicle seat which is retractably arranged in a base section, whereby said base section preferably constitutes the backrest of a vehicle seat.

BACKGROUND OF THE INVENTION

Vehicle seats of the type which are stowable and retractably arranged in a base section are previously known. A vehicle seat is previously known from, for example, GB-A-2 167 949 (preamble of claim 1) which comprises a seat section and a back section, preferably pivotably arranged in relation to each other, whereby the seat is inwardly and outwardly foldable and in its outwardly foldable position it can be arranged with the two sections in substantially perpendicular positions for use as a seat, or with the two parts in substantially parallel position for use as an armrest (see also EP-A-258 194).

The above-mentioned document accordingly shows a child cushion (vehicle seat) whose positioning and construction is such that in its outwardly folded position it may also be used as an armrest. A centrally placed inwardly foldable armrest in a vehicle is common. From the above-mentioned documents it is accordingly also known to construct an armrest in such a way that it can be divided and used as a child cushion.

TECHNICAL PROBLEM

The disadvantage with this known combination of vehicle seat and armrest is that the arrangement is relatively cumbersome. The reason for this is that the seat section of a vehicle seat requires a certain width, and which width considerably exceeds the width which is necessary for an armrest. In other words, the known arrangement offers an armrest which considerably exceeds the optimal width for an armrest.

Furthermore, the known arrangement also presents disadvantages in its inwardly folded position since its relatively wide width implies that the separation surfaces which delimit the inwardly foldable seat/armrest will intrude on the back-rest section of the seats adjacent this seat such that the comfort of these seats is prejudicially affected.

SUMMARY AND OBJECTS OF THE INVENTION

One aspect of the present invention discloses a vehicle seat assembly comprising a first seat, which may be the permanent rear seat in a vehicle. The first seat includes a fixed base portion defining a base surface, also known as a squab, extending generally along a horizontal plane. The first seat also includes a back portion, which is often retained in a fixed position, and which defines a surface extending substantially perpendicular to the base surface. The back portion includes a recess therein, such as the recess often used to store the armrest of a vehicle when it is not in use. The vehicle seat assembly also comprises a second seat which includes a stowable base portion and a stowable back portion. The second seat is preferably pivotably connected to the first seat and is movable between a stowed position in which both the stowable base portion and the stowable back portion extend substantially parallel to each other and substantially perpendicular to the base surface and are at least substantially arranged within the recess in the back portion of the first seat, and a use position in which at least the stowable base portion is arranged substantially outside of the recess and extends generally parallel to the base surface of the first seat. The stowable base portion includes widening means for selectively adjusting at least a portion of the initial width thereof so that an adjusted width can be obtained. The adjusted width is greater than the initial width so that children of various sizes can comfortably sit on the second seat when it is arranged in its use position.

Preferably, the vehicle seat assembly comprises means for maintaining the stowable base portion at a certain predetermined height above the base surface of the fixed base portion when the second seat is arranged in its use position.

It is also preferable for the vehicle seat assembly to comprise safety belt means adapted to secure an occupant on the second seat. The safety belt means may comprise a three point inertia-reel type safety belt which may be secured to the back portion of the first seat.

In a preferred embodiment, the stowable base portion may comprise a resilient compressible material and an elastic cover arranged over the resilient compressible material. In another preferred embodiment, the stowable base portion may comprise a substantially non-compressible material and a non-elastic cover arranged thereon. In such an embodiment, the non-compressible material may comprise a form-stable polymer which has a low density.

In another preferred embodiment, the widening means may comprise a plurality of cooperating frame members wherein at least two of the plurality of cooperating frame members are inner members and at least one of the plurality of cooperating frame members is an outer member. In this embodiment, the inner members may be arranged within the outer member and may be disposed for slidable movement therein so that the width of the stowable base portion can be selectively adjusted.

In still another preferred embodiment, the stowable base portion may comprise a first block and a second block. In this embodiment, the plurality of cooperating frame members are connected to the first and second blocks. The widening means may also comprise locking means arranged between the inner and outer frame members for selectively locking the first and second blocks in desired adjusted positions whereby the first and second blocks are adapted to be spaced from each other when the stowable base portion is adjusted into its widest position.

The widening means may comprise at least one pivot joint and may have at least two sections pivotably connected to each other at the at least one pivot joint. The at least one pivot joint may be arranged at a first end of the stowable base portion adjacent the recess when the stowable base portion is arranged in its use position. A second end of the stowable base portion may be arranged to oppose the first end and may be remote therefrom. In this embodiment, the widening means may be adapted to increase the width of the second end of the stowable base portion more than the width of the first end thereof.

In another preferred embodiment, the stowable base portion includes a main section and at least one pivotable section. The at least one pivotable section is pivotally connected to the main section at a pivot joint which may comprise a hinge-like device. In operation, the at least one pivotable section is movable from a folded position at which the stowable base portion may retain its initial width, to an extended position at which the stowable base portion achieves an adjusted width which is greater than the initial width thereof. In this embodiment, the at least one pivotable section preferably comprises a pair of pivotable sections and the main section is arranged between the pair of pivotable sections and is hingedly connected thereto by the at least one hinge-like device.

In a particularly preferred embodiment, the widening means comprises a first plate-like member and a second plate-like member slidably interconnected to each other. Optionally, the first and second plate-like members include a plurality of aligned elongated slots. In this embodiment, the widening means preferably includes at least one transverse guide pin arranged to extend through at least one pair of the aligned elongated slots to guide selective widening of the stowable base portion. The first and second plate-like members may be slidably arranged on a fixed member whereby adjustment of the plate-like members may increase the overall width of the stowable base portion beyond that of the width of the fixed member.

It is an object of the present invention to provide a stowable and outwardly- and inwardly foldable vehicle seat which eliminates the above-mentioned disadvantages though which still maintains these advantages, namely the combination of a vehicle seat and an armrest in one.

A further object of the invention is to provide such a child cushion/vehicle seat which in a rational manner offers maximum security and whose production and assembly can be achieved in a rational and thereby cost effective manner.

Said objects are achieved by means of an inwardly foldable vehicle seat in accordance with the invention which is characterized in that the seat section is arranged with expandable means so that the extension of the seat section in the direction of its width can be changed.

BRIEF DESCRIPTION OF THE DRAWINGS

The invention will be described in more detail with reference to the embodiments shown in the attached drawings in which.

BEST MODE OF CARRYING OUT THE INVENTION

Figure 1A:
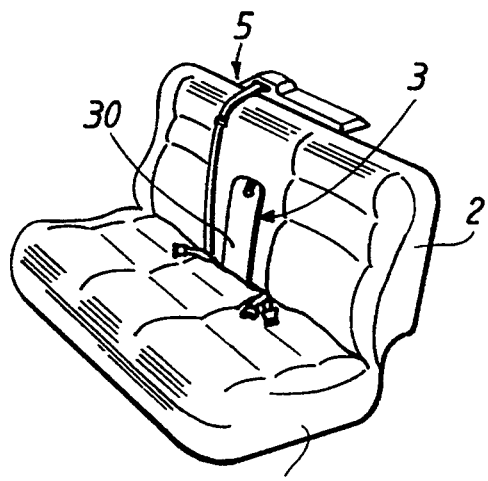
FIGS. 1a–1d shows perspective views of a vehicle rear seat with an stowable vehicle seat in various positions according to the invention.

The seat shown in FIG. 1 is a rear seat of conventional type with a squab 1, a back-rest 2 and an armrest generally denoted by 3 which in a known manner is supported for pivotal movement between a folded up position (FIG. 1a) in which it occupies a recess in the back-rest 2, and a folded down position (FIG. 1b) in which it can be used as an armrest.

In its folded up position (FIG. 1a) the armrest's underside 30 is planer with the seats back-rest 2. In its folded down position (FIG. 1b) the armrest's underside 30 rests against the squab's 1 upper surface. From the folded down position (FIG. 1b) it can be further seen that the armrest consists of a lower part 3 and an upper part 4.

Figure 1B:
Figure 1C:
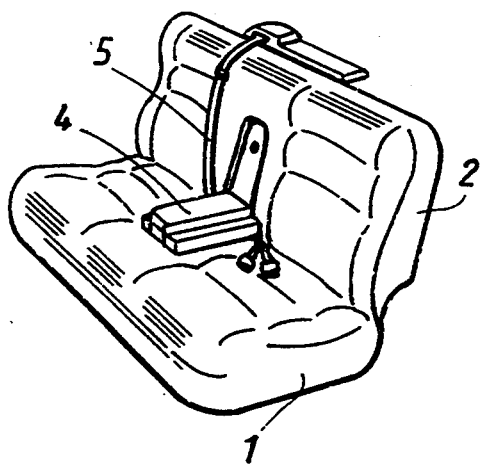
Figure 1D:
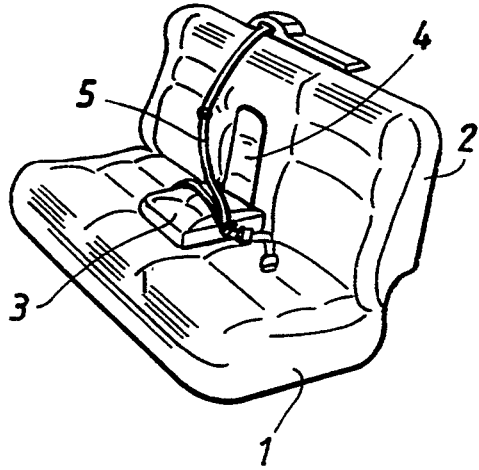

A position is shown in FIG. 1c in which the armrest's lower part 3 is widened with the help of parts in the seat section 3 which are displaceable sideways. In order to form a vehicle seat, the upper part 4 must now be swung upwardly so that this upper part 4 forms a back-rest for the vehicle seat in accordance with that which is shown in FIG. 1d. By adapting the thickness (height) of the seat section 3, a centrally mounted seatbelt 5 can be tensioned in a secure manner around a child sitting on the vehicle seat since the diagonally extending part of the seatbelt can in this manner be adapted to pass over the optimal position of the child's body despite the fact that the seatbelt is primarily intended to be worn by an adult (sitting on the squab).

Figure 2:
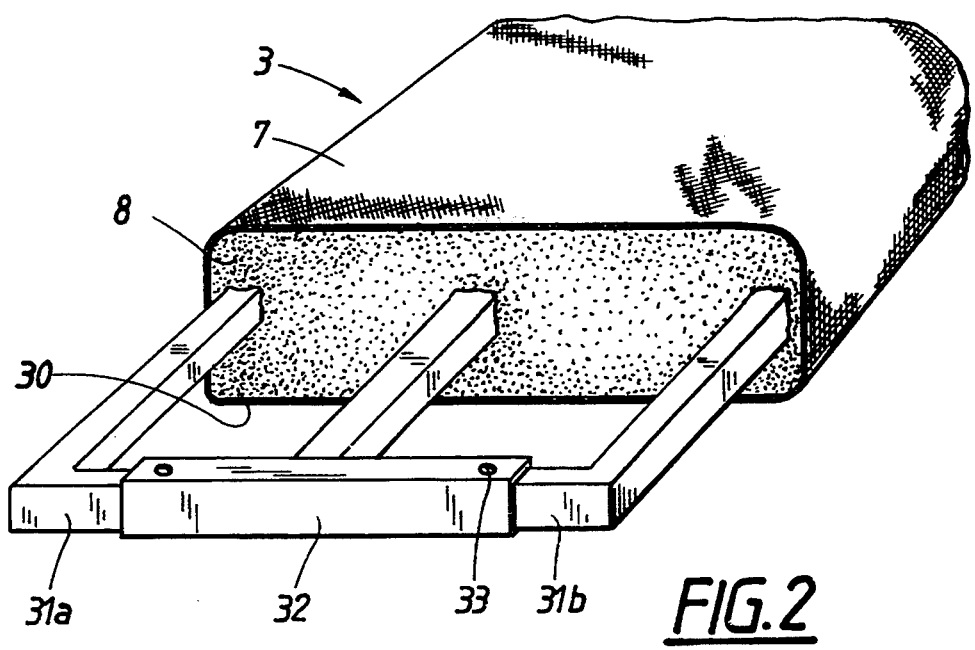
FIG. 2 shows a perspective view of a preferred embodiment for widening of the seat section according to the invention.

The principle for the preferred manner in which the widening of the seat section 3 can be arranged is shown in FIG. 2. The figure shows that two side members 31a and 31b are transversally displaceably arranged in relation to a central member 32 within the seat section 3. These members are in the form of square section tubes which are displaceably arranged with respect to each other. The widening of the seat section 3 is possible due to the seat section having an elastic cover 7 and an elastic stuffing 8. The frame members 31, 32 are suitably held in relation to each other in the widen position with help of spring-biased ball bearings (not shown) which snap into corresponding holes in a manner known per se.

Figure 3:
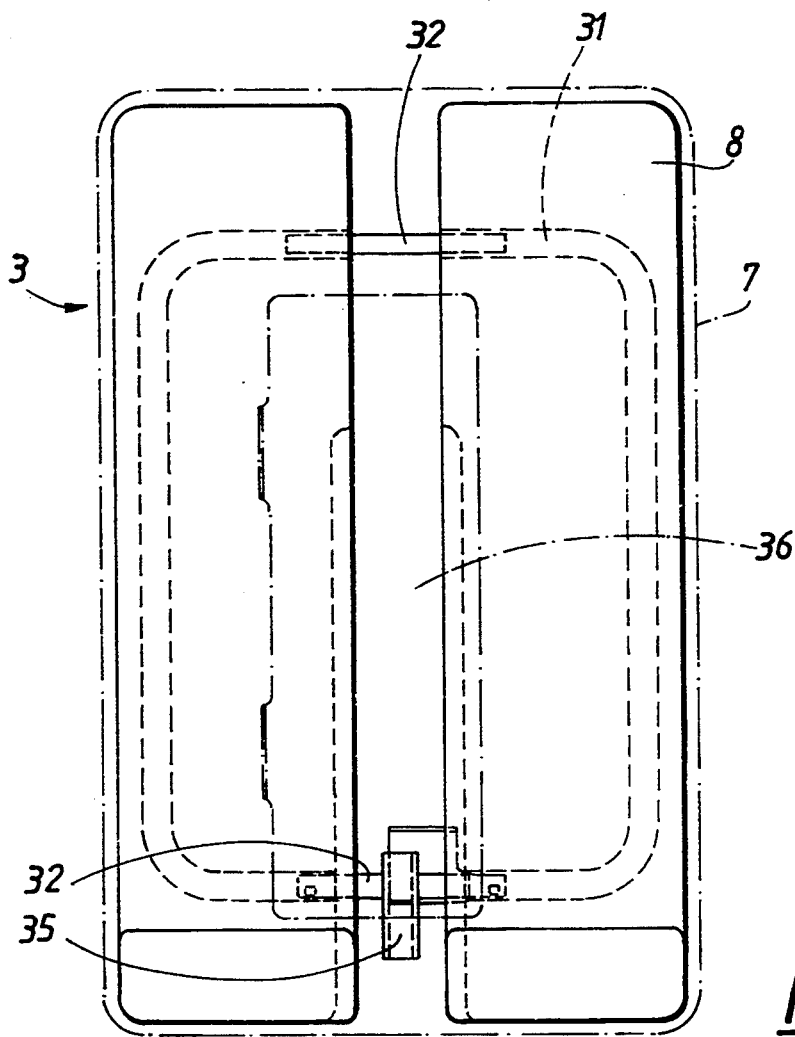
FIG. 3 shows a plan view of a seat section in its widened position according to the principle illustrated in FIG. 2, FIGS. 4a–4b are side views of the preferred embodiment of the vehicle seat according to the invention.

A plan view of a seat section 3 is shown in FIG. 3 with in principle the same widening system which is shown in FIG. 2, i.e. outer frame members 31 which are transversally displaceably arranged around transversally positioned mid sections 32. For attachment of the seat section a tube-like element 35 extending in the direction of the seat is provided on the innermost of said mid sections 32.

In the embodiment shown in FIG. 3, the stuffing 8 preferably consists of a substantially non-compressible material such as a form-stable polymer of low density. In addition, the material 8 is divided into two blocks which, in the widened position, create an opening 36 therebetween. The cover 7 is preferably substantially non-elastic in this embodiment and forms preshaped pleats when the seat section 3 is return to its non-widened position. However, it should be appreciated, that the stuffing material 8 and the cover 7 may also be elastic as they are in the embodiment of FIG. 2.

Figure 4A:
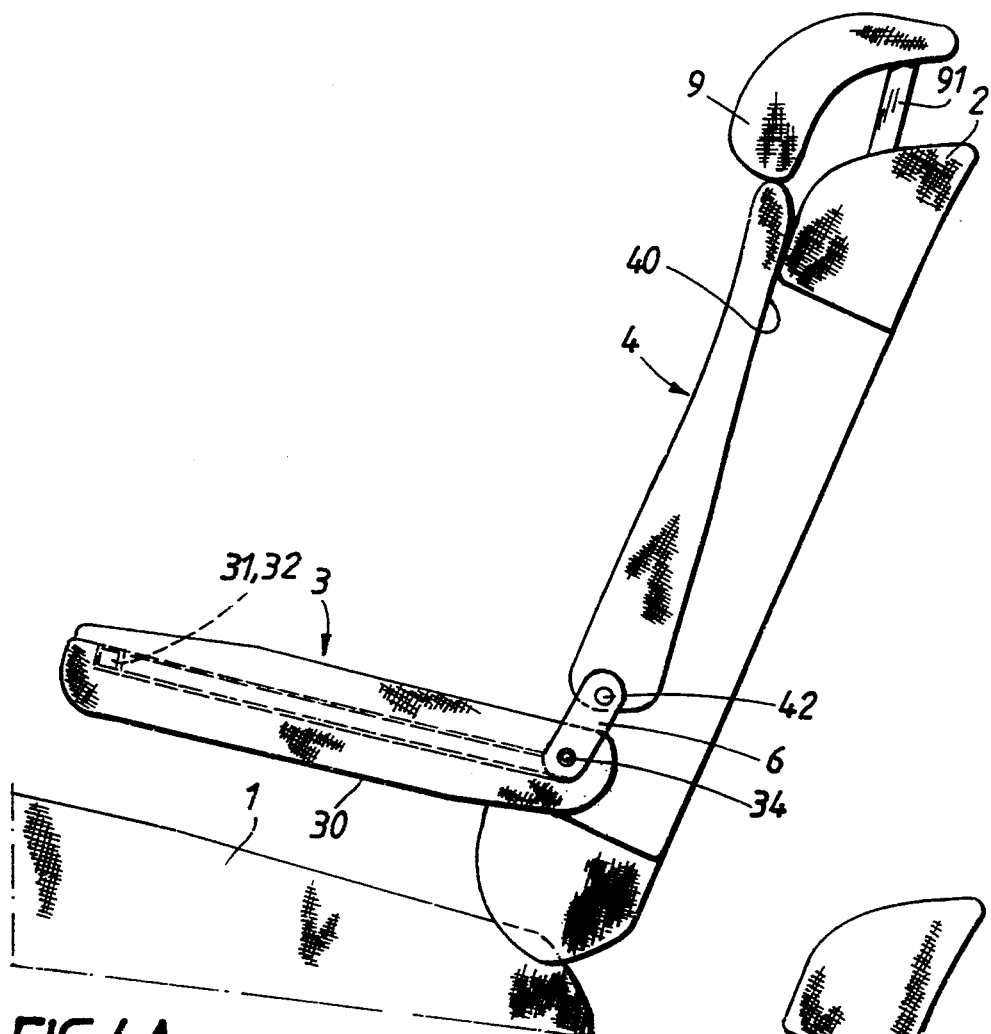
Figure 4B:
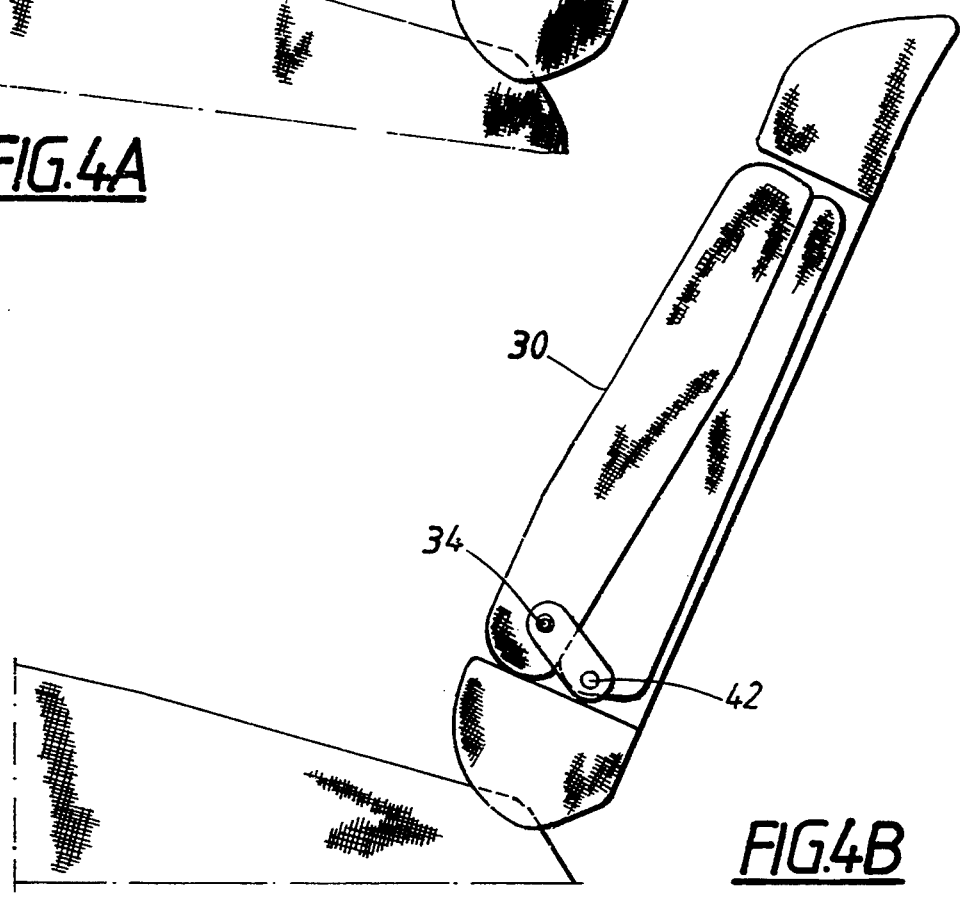

FIG. 4a shows a side view of a preferred vehicle seat according to the invention in its extended position, i.e. in its position of use. In this position the vehicle seat's seat section 3 is substantially parallelly arranged in relation to the squab 1 of the vehicle seat and the back-rest 4 is locked (not shown locking mechanism) in an upright position so that its rear surface 40 abuts the upper region of the rear seat's back-rest 2. The two seat sections 3, 4 are connected to each other by means of two brackets 6, one on each side, which are fixed to the seat section 3. The back-rest 4 is pivotably arranged on the brackets 6 with the aid of a pivot pin 42. The entire vehicle seat 3, 4 is supported in frame sections to the rear seat 2 with the aid of a second pivot pin 32 whose centerline passes through the seat section 3. The widening arrangement 31, 32 for the seat section 3 depicted in principle in FIGS. 2 and 3 is outlined by means of dashed lines within the seat section 3.

The vehicle seat is intended to be used together with a three point inertia-reel seatbelt 5 affixed to the rear seat 2. Thanks to the relatively high location of the seat 3, in its fastened state the seatbelt extends in an optimal manner over the body of a child and, similarly, the seatbelt extends optimally over the body of an adult person when sitting on the squab 1. With the intention to optimize safety, a back/neck support 9 is provided along an extension of the back section 40 and is extendable with the help of a displaceable rod 91 by which the rest 9 is positioned on the back section. By means of this displaceable support 9, people (chiefly children) of various height (within limits, up to approximately ten years) are offered maximum support in the event of an accident. A further safety-improving factor is that the seat is dished so that submarining is avoided in a collision. As can be seen from the drawing, the seat 3 is locked in its folded-down raised position without making contact with the squab 1, i.e. with the aid of a position determining mechanism in the vicinity of the support point 44.

If the seat is to be converted to an armrest, the back section 4 is simply folded down by swinging it about the pivot point 42 once the lock has been released. Accordingly, in this application, the maximum widening of the seat is not necessary or desirable and so it 3 can be pushed in in order to be as narrow as possible. From this narrowest position it is then possible to swing the entire arrangement to the position which is shown in FIG. 1b.

Figure 5:
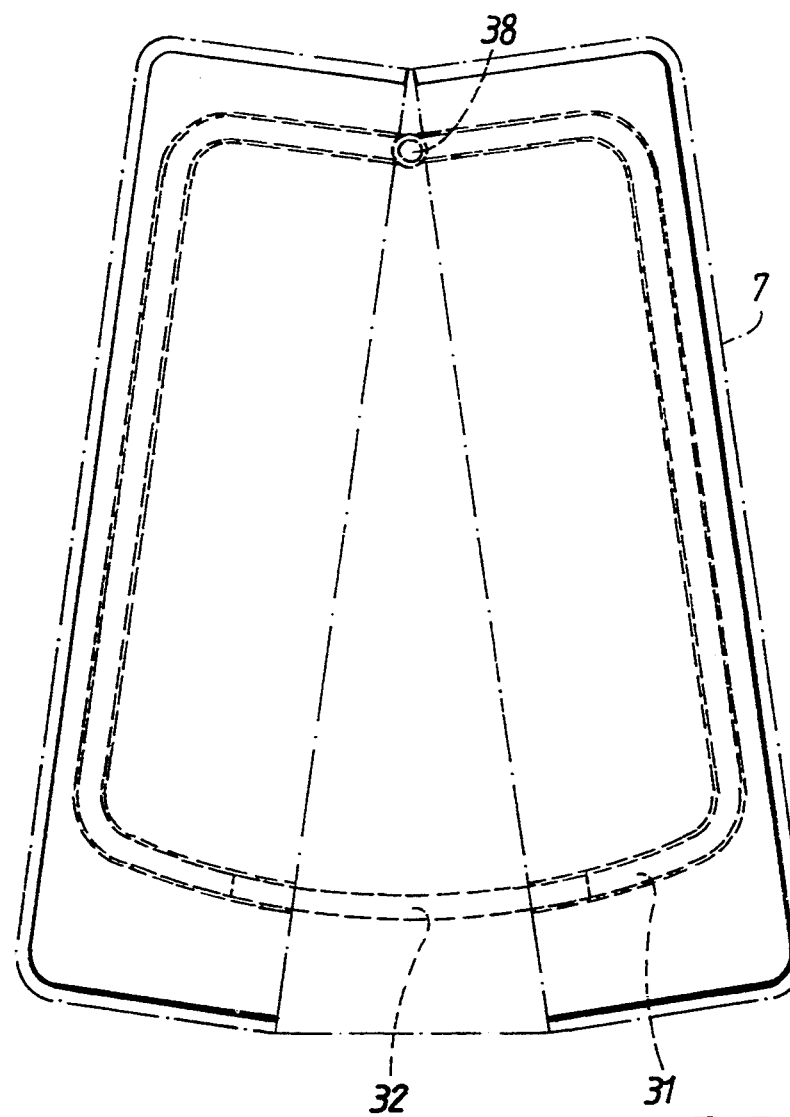
FIG. 5 shows a second embodiment for achieving widening according to the invention.

A further widening possibility is shown in FIG. 5 which consists of two outwardly- and inwardly pivotable frame sections 31 which are pivotably arranged about a pivot point 38. In order to guide the forward edge, a tube piece 32 of suitable curvature is provided which passes within said frame sections 31.

Figure 6:
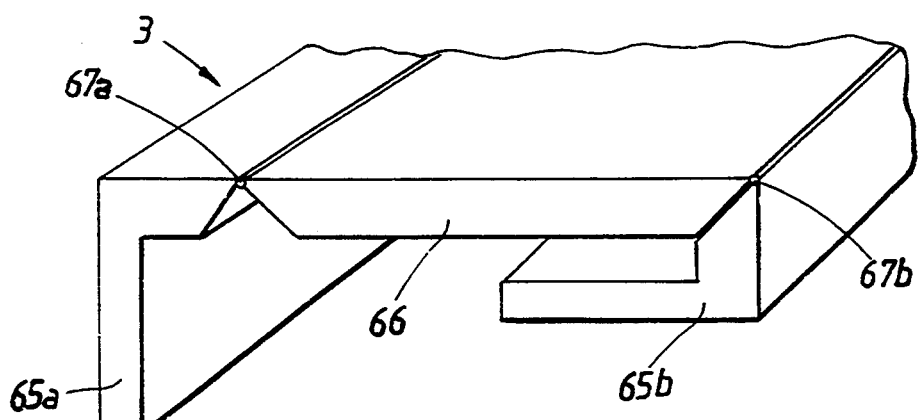
FIG. 6 shows a third embodiment for achieving widening according to the invention.

A second principle for achieving widening of the seat section 3 is shown in FIG. 6. On each side of a mid section 66 of the seat 3 is arranged a seat section 65a, 65b respectively, pivotable by means of hinge-like devices 67a, 67b. When the pivotable sections (see 65a) of the seats are in their folded out position, their upper delimiting surface forms widening side surfaces adjacent the middle seat section 36 and the downwardly extending region can hereby be arranged to abut the squab 1. In the folded up position (see 65b), the seat is delimited in its transverse direction by said hinge-like devices 67b and the support regions of the pivotable part 65b are inwardly directed and thereby placed in the vicinity of remaining parts of the seat 66.

Figure 7C:
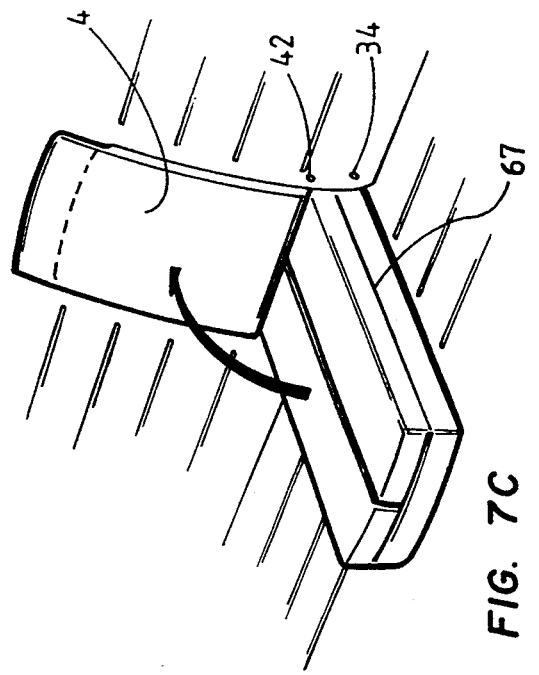
FIGS. 7a–7d shows perspective views of the stowable vehicle seat of FIG. 6 in various positions with respect to a rear seat of a vehicle.
Figure 7D:
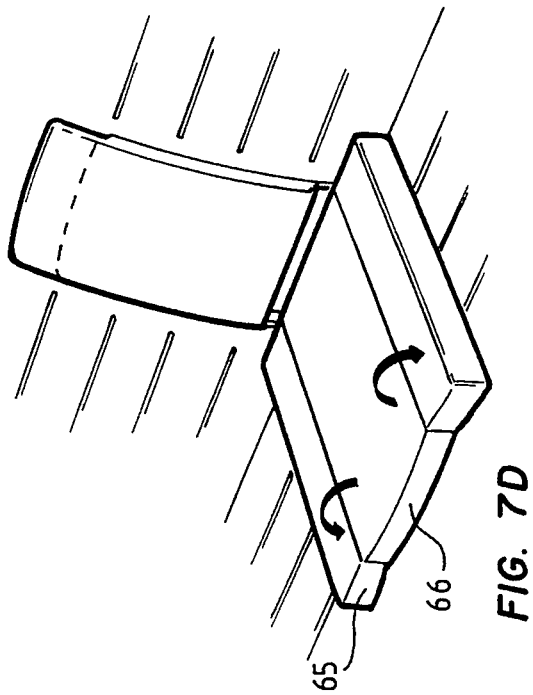
Figure 7A:
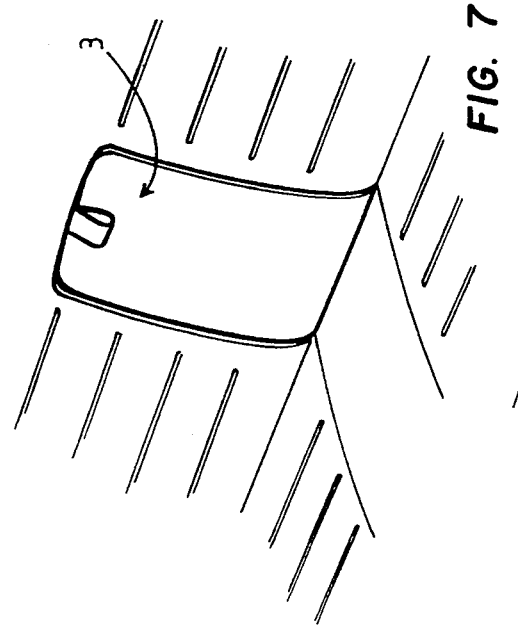
Figure 7B:
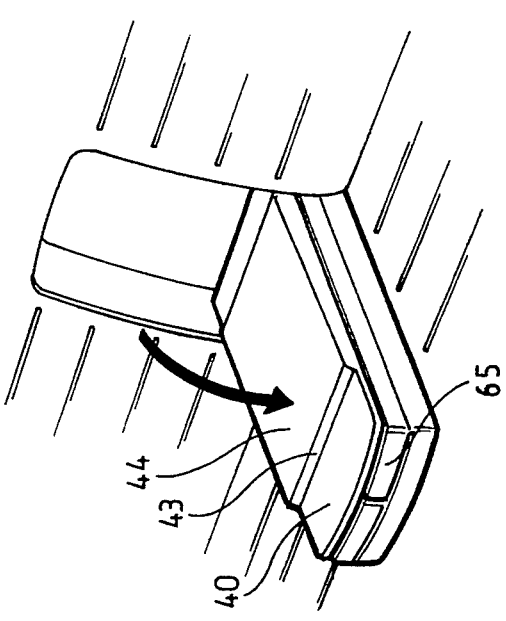

FIG. 7a shows the seat section 3 in its non-use (i.e., folded up) position within a recess in the rear seat of a vehicle. In contrast to FIG. 7a, FIGS. 7b–7d shows that the pivotable seat sections 65 are placed on top of the base section 66 in the folded up position. Thus, FIG. 7a shows the folded up position, FIG. 7b shows the position when it can be used as an arm rest, FIG. 7c shows the position where the back rest is swung upwards and FIG. 7d shows the position of use for the seat without outwardly-folded side pieces 65. The back section 4 is pivotably arranged 42 about a plate or similar (not shown) which is affixed to the base section 66 which, in turn, is pivotably supported 34 to the rear seat 2. By means of a gentle transition 43, the armrests upper surface changes from a region 40 with a substantially flat and hard surface (which in the folded down position can for example be used as a placement surface and in the raised position rests against the rear seats back section 2) to a region 44 with a soft surface.

Figure 8:
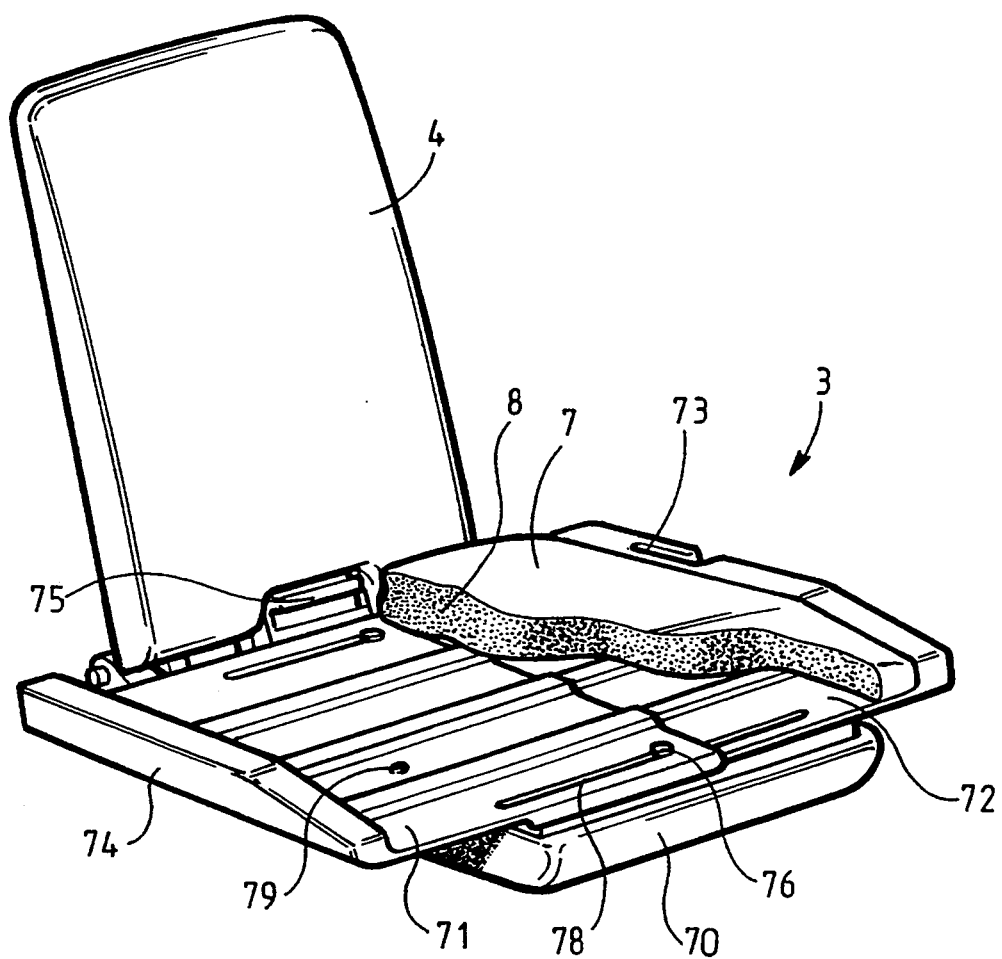
FIG. 8 shows the most preferred embodiment relating to the widening of the seat section according to the invention.

FIG. 8 shows a seat section 3 comprising a non-widenable base section 70 above which widening means 71, 72 in the form of plate-like elements are slidably arranged. To allow for parallel displacement of the elements 71, 72, each plate is provided with at least two slots 78 which cooperate with at least two peg-like members 76 which are anchored in said base section 70. Each element 71, 72 is outwardly delimited in the sideways direction by a hollow region 74 which serves both as a grip indent (for manual widening) and a seatbelt guide 73. The seat cushion 7, 8 of fabric-covered foam rubber is fixed in the vicinity of each side region 74 so that widening and collapsing can take place without the seat cushion obstructing this movement, suitably with the help of longitudinal seams (not shown) which ensure that the cushion 7, 8 is pleated in an aesthetic manner. In order to receive confirmation that the maximum widening has been achieved, together with its maintenance, each plate-like element 71, 72 is provided with an upwardly-directed depression 79 which cooperates with a spring-biased ball bearing (not shown) or similar arranged in the base section 70. A lock 75 prevents unwanted folding down of the back section 4.

The invention is not restricted to that described above but can be varied within the scope of the appended claims. It is for example possible that the guide means 76, 78 described above comprise guide pins which are arranged in transversally (in relation to the seats longitudinal direction) extending slots, whereby each element 71, 72 suitably has at least two guide pins affixed thereto and these guide pins are displaceably arranged in at least two slots in said base section.

Furthermore, the invention is not restricted to the use of a back section 4 in accordance with that mentioned above, but it can for example be in the form of a separate part which can be lifted from the seat section to be located in the recess. In an extreme case in which the armrest (collapsed) is very narrow it is possible not to use a back section at all, though this is not preferred from a safety point of view. Finally, it is possible to arrange the back section 4 on a separate displacement mechanism (for example with four degrees of freedom) which can be suitably arranged to swing outwards when the seat section 3 is widened. The widening of the seat section occurs in the preferred case in a manual manner. It is, however, clear for the skilled man that the widening can also occur with assistance, such as with solenoids, electric motors, pressure cylinders etc. Such accessories can suitably be activated by means of a push-button or similar which is either arranged within the seat section 3 and so not accessible in the seat's 3 upwardly folded position or remote from the seat 3 and therefore including means which prevent widening of the seat if the seat is not in its folded down position.

We claim:

1. A vehicle seat assembly comprising:
   a first seat including a fixed base portion defining a base surface extending generally along a horizontal plane, and a back portion defining a surface extending substantially perpendicular to said base surface, said back portion having a recess therein;
   a second seat including a stowable base portion and a stowable back portion, said second seat being pivotally connected to said first seat along a pivot axis and being movable between a stowed position in which both said stowable base portion and said stowable back portion extend substantially parallel to each other and substantially perpendicular to said base surface and are at least substantially arranged within said recess, and a use position in which at least said stowable base portion is arranged substantially outside of said recess extending generally parallel to said base surface, said stowable base portion having side edges and an initial width measured between said side edges wherein each of said side edges define a longitudinal axis which intersects said pivot axis and including widening means for selectively adjusting said initial width so that an adjusted width is created, said adjusted width being greater than said initial width whereby children of various sizes can comfortably sit on said second seat when it is arranged in said use position.

2. The vehicle seat assembly of claim 1 wherein said first seat comprises a rear seat.

3. The vehicle seat assembly of claim 1 further comprising means for maintaining said stowable base portion at a certain predetermined height above said base surface of said fixed base portion when said second seat is arranged in said use position.

4. The vehicle seat assembly of claim 1 further comprising safety belt means adapted to secure an occupant on said second seat.

5. The vehicle seat assembly of claim 4 wherein said safety belt means comprises a three point inertia-reel type safety belt secured to said back portion of said first seat.

6. The vehicle seat assembly of claim 1 wherein said stowable base portion comprises resilient compressible material and an elastic cover arranged over said resilient compressible material.

7. The vehicle seat assembly of claim 1 wherein said stowable base portion comprises a substantially non-compressible material and a cover arranged thereon.

8. The vehicle seat assembly of claim 7 wherein said substantially non-compressible material comprises a form-stable polymer having a low density.

9. The vehicle seat assembly of claim 1 wherein said widening means comprises a plurality of cooperating frame members, at least two of said plurality of cooperating frame members being inner members and at least one of said plurality of cooperating frame members being an outer member, said inner members being arranged within said outer member and being disposed for slidable movement therein whereby said width of said stowable base portion can be selectively adjusted.

10. The vehicle seat assembly of claim 1 wherein stowable base portion comprises a first block and a second block, said plurality of cooperating frame members being connected to said first and second blocks, said widening means further comprising locking means arranged between said inner and outer frame members for selectively locking said first and second blocks in desired adjusted positions whereby said first and second blocks are adapted to be spaced from each other when said stowable base portion is adjusted into its widest position.

11. The vehicle seat assembly of claim 1 wherein said widening means comprises at least one pivot joint and at least two sections pivotably connected to each other at said at least one pivot joint.

12. The vehicle seat assembly of claim 11 wherein said stowable base portion has a first end adjacent said recess when it is arranged in said use position, and a second end opposing said first end and remote therefrom, said at least one pivot joint being arranged at said first end, said widening means being adapted to increase the width of said second end to a size greater than the width of said first end.

13. The vehicle seat assembly of claim 11 wherein said stowable base portion has a main section and at least one pivotable section, said at least one pivotable section being pivotably connected to said main section at said at least one pivot joint and being movable from a folded position at which said stowable base portion retains its initial width to an extended position at which said stowable base portion achieves said adjusted width which is greater than said initial width.

14. The vehicle seat assembly of claim 13 wherein said at least one pivotable section comprises a pair of pivotable sections, said main section being arranged between said pair of pivotable sections and being hingedly connected thereto at said at least one pivot joint, said at least one pivot joint including said at least one hinge-like device.

15. The vehicle seat assembly of claim 1 wherein said widening means comprises a first plate-like member and a second plate-like member slidably interconnected to said first plate-like member for permitting selective adjustment of said first and second plate-like members.

16. The vehicle seat assembly of claim 15 wherein said first and second plate-like members comprise a plurality of aligned elongated slots, said widening means further comprising at least one transverse guide pin arranged to extend through at least one pair of said aligned elongated slots to guide selected widening of said stowable base portions.

17. The vehicle seat assembly of claim 16 wherein said stowable base portion further comprises a fixed member, said first and second plate-like members being arranged on said fixed member whereby slideable adjustment thereof can modify the overall width achieved by the combination of said first and second plate-like members to a width greater than the width of said fixed member.

18. A stowable vehicle seat comprising a stowable base portion and a stowable back portion pivotally connected to said stowable base portion, said stowable seat being movable between a stowed position in which both said stowable base portion and said stowable back portion extend substantially parallel to each other and substantially perpendicular to a base surface of a rear seat in a vehicle, and a use position in which said stowable base portion extends substantially parallel to the base surface of the rear seat, said stowable base portion having an initial width and including widening means for selectively adjusting at least a portion of said initial width so that an adjusted width is created, said adjusted width being greater than said initial width, said stowable vehicle seat further comprising means for maintaining said stowable base portion at a certain predetermined height above and spaced from the base surface defined by the rear seat in the vehicle when said stowable seat is arranged in said use position.

19. The stowable vehicle seat of claim 18 further comprising safety belt means adapted to secure an occupant therein.

20. The stowable vehicle seat of claim 19 wherein said safety belt means comprises a three point inertia-reel type safety belt.

* * * * *